United States Patent [19]
Carnanhan et al.

[11] 3,780,772
[45] Dec. 25, 1973

[54] COUPLING ARRANGEMENT FOR PROVIDING UNIFORM VELOCITY DISTRIBUTION FOR GAS FLOW BETWEEN PIPES OF DIFFERENT DIAMETER

[75] Inventors: Robert D. Carnanhan, Barrington; Karl J. Youtsey, Chicago, both of Ill.

[73] Assignee: Universal Oil Products Company, Des Plaines, Ill.

[22] Filed: Mar. 2, 1972

[21] Appl. No.: 231,141

[52] U.S. Cl. ............................................... 138/37
[51] Int. Cl. ............................................... F15d 1/02
[58] Field of Search ................. 138/37, 39, 40, 44, 138/42; 23/288 F

[56] References Cited
UNITED STATES PATENTS
3,692,497  9/1972  Keith et al. ..................... 23/288 F
3,441,381  4/1969  Keith et al. ..................... 23/288 F Primary Examiner—George E. Lowrance
Assistant Examiner—Steven M. Pollard
Attorney—James R. Hoatson, Jr. et al.

[57] ABSTRACT

Coupling arrangement provides uniform velocity distribution between pipes of different diameters where the diameter differences are greater, and/or the axial spacing of the pipes is less than that which would be required to permit a uniform velocity distribution if a flared connector joined the ends of the two pipes. The coupling includes a frusto-conical transition member which connects the end of the larger pipe to the smaller pipe at a location which is spaced axially from its end. By closing the end of the smaller pipe except for at least one small opening proximate its axis and by providing a series of circumferentially spaced openings around its walls between its end and the points at which the transition member is attached to it, it is possible to cause gas flow from the smaller to the larger pipe to have a substantially uniform velocity distribution across the end of the large pipe. The coupler is particularly useful in distributing polluted exhaust gases from a relatively small diameter engine exhaust pipe to a relatively larger diameter honeycomb-shaped catalytic reactor element since it permits a minimum spacing between the exhaust pipe and catalytic element and a reduction in the amount of catalyst contained in the reactor.

7 Claims, 3 Drawing Figures

PATENTED DEC 25 1973 3,780,772

COUPLING ARRANGEMENT FOR PROVIDING UNIFORM VELOCITY DISTRIBUTION FOR GAS FLOW BETWEEN PIPES OF DIFFERENT DIAMETER

BACKGROUND OF THE INVENTION

This invention relates to the field of pipe coupling devices and especially to devices for coupling a small diameter pipe to a large diameter pipe so that gases within the smaller diameter pipe will be distributed as uniformly as possible across the transverse entrance plane of the larger pipe.

It has generally been found by those working in the field of fluid dynamics that when fittings connecting the ends of different diameter, axially spaced pipes must have a flare in excess of about 15°, that the radial velocity distribution of the flow becomes non-uniform. This situation presents a particular problem in an exhaust system for a motor vehicle wherein hot exhaust gases from a relatively small diameter exhaust pipe, such as 2.00 inches for example, are directed against the face of a relatively large diameter, such as 4.75 inches for example, catalyst coated, honeycomb-shaped element. Space limitations and a desire to reduce back pressure make it desirable to present a large face area of catalyst to the exhaust gases. Since the exhaust gases must pass in contact with the catalyst for at least a minimum contact period, it is essential that the catalytic device be sufficiently long to permit the required contact when the gases are at their highest expected velocities. In view of the fact that extremely precious metals such as platinum are usually used as the catalyst it is highly desirable that the catalytic element be as small as possible while still having enough surface area to treat all of the exhaust gases. Unfortunately, tests have indicated that for a 4.75 inch diameter catalytic element placed 0.875 inches away from the outlet of a 2.00 inch diameter exhaust tube, 74 percent of the volumetric throughput of gases passes through the central 45 percent of the element cross-sectional area. This highly uneven distribution results in the catalyst at the edges of the element being used to less than its capacity and is therefore wasteful.

SUMMARY OF THE INVENTION

It is an object of this invention to provide a coupling arrangement for axially closely spaced pipes of different diameters which will cause the velocity distribution of gases passing from the smaller pipe to the larger one to be substantially uniform across the entire transverse entrance face of the larger pipe.

It is an additional object of this invention to provide a diffusing device for uniformly distributing polluted engine exhaust gases to a catalytic reactor element in a manner which will minimize back pressure in the exhaust system, and which will require a minimum amount of catalyst.

These and other objects are attained by the coupling arrangement of the present invention wherein a perforated diffuser member is attached to the exit end of a small diameter pipe. The diffuser member includes a plurality of circumferentially spaced radially extending openings in its wall surface and at least one small opening in its otherwise closed end surface proximate the axis of the pipe. The diffuser is axially spaced by a short distance from the inlet end of a larger diameter pipe. A frusto-conical transition member connects the end of the larger pipe to the exterior wall of the smaller pipe at a location spaced axially inwardly from its end surface and from said plurality of openings.

In a preferred embodiment, the coupling arrangement is used as a diffuser to direct exhaust gases from an internal combustion engine to a catalytic reactor having a relatively large diameter honeycomb shaped reaction member which treats the gases and removes certain exhaust pollutants. The exhaust gases are diffused by the diffuser member so that their volumetric throughput per unit of area at any particular region of the honeycomb catalytic reaction element is substantially constant even though the area of the honeycomb element is several times larger than the area of the smaller pipe and positioned so close to it that the rate of flow through the various portions of the honeycomb element would be very uneven, were the diffuser not present. The diffuser member permits a small amount of gas to move axially toward the center of the honeycomb element but the major portion of the gas is directed outwardly through the side openings. The outwardly directed gas strikes the inner wall of the frusto-conical transition member and is relatively uniformly directed thereby against the honeycomb element. For the best diffusion, the side openings should have a total area which is between about 33–67 percent of the area of the smaller pipe while the end opening should have an area between about 1–10 percent of the area of the smaller pipe.

DESCRIPTION OF THE PREFERRED EMBODIMENT

Figure 1:
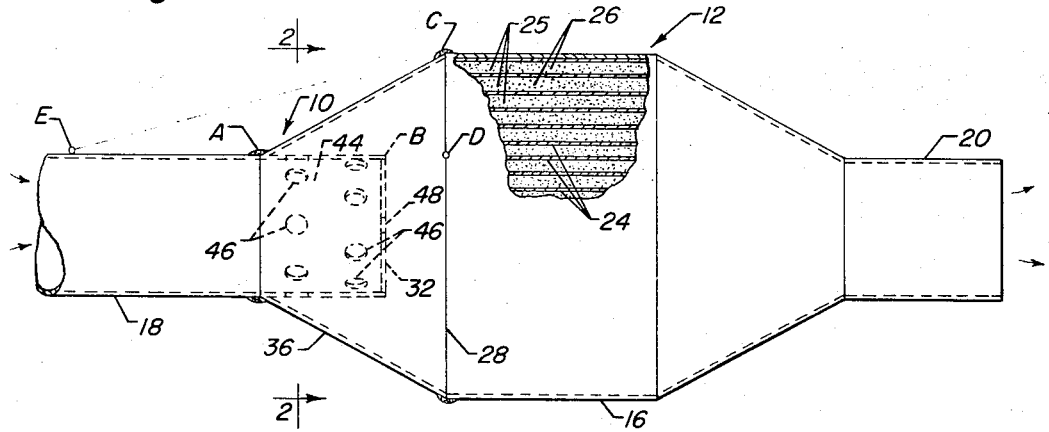
FIG. 1 is a partially sectioned side plan view of the improved coupling arrangement taken on the line 1—1 of FIG. 2.
Figure 2:
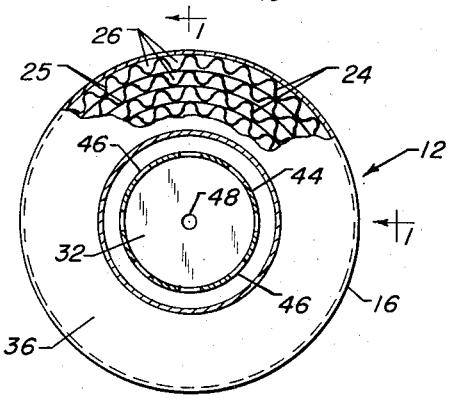
FIG. 2 is a fragmentary sectional end view taken on the line 2—2 of FIG. 1.

Referring to FIG. 1, the improved coupling arrangement indicated generally at 10 is shown as being mounted integrally with a catalytic reactor unit indicated generally at 12. The reactor unit 12 comprises a large diameter pipe or casing member 16 having a small diameter inlet pipe 18 at one end and a small diameter outlet pipe 20 at its other end. Positioned within the chamber formed by the inner walls of casing 16 is a honeycomb-shaped ceramic element 24 having a catalytic coating 25, such as platinum, covering the exposed surface of honeycomb channels 26. The inlet side or face portion 28 of the honeycomb element 24 is arranged normal to the axis of the inlet pipe 18 and is axially spaced from an exit face member 32 which substantially covers the end of pipe 18. The exit face member 32 is preferably integral with the end of pipe 18 and may be attached thereto by welding, for example. The term "honeycomb," as used herein is not meant to be specifically limited to a member wherein the axial cells are hexagonally shaped, but rather is meant to cover any configuration wherein there are a plurality of axially extending channels. The element 24, for example, is a spiral wound, corrugated ceramic.

The inlet pipe 18 is joined to the casing 16 by a frusto-conical transition member 36 which is welded at one end to the pipe 18 along a circular line of attachment "A" and at the other end, to the end of pipe 16 along a circular line of attachment "C." The outer end portion of pipe 18 comprises a diffuser portion 44. The diffuser portion 44 has a length $\overline{AB}$ where "A" is the aforementioned line of attachment where pipe 18 joins the frusto-conical member and "B" is the outer end edge of face member 32. The diffuser portion 44 contains a plurality of circumferentially spaced side openings 46 and an axial opening 48 in exit face member 32 and is spaced from face portion 28 by the distance $\overline{BD}$ where D is a point on face portion 28 which is located on an extension of line $\overline{AB}$. The side openings are shown as two rows of holes but could have other shapes which would provide equivalent areas. To insure uniform flow, there should be at least three openings spaced around diffuser 44. Opening 48 is shown as a single axial hole but could be several openings proximate the axis.

Point "E" in FIG. 1 represents the approximate imaginary location on pipe 18 where that pipe would have to terminate relative to pipe 16 in order to permit the adjacent ends of the two pipes to be joined by a flared, or frusto-conical connector member having a flare angle (included angle between lines $\overline{EC}$ and $\overline{ED}$) of 15°. An angle of 15° is generally considered to be the maximum flare angle which can be present between two pipes of varying diameters when it is necessary that gas flow from the smaller pipe to the larger be uniformly diffused so that equal volumes will pass through any area of the larger pipe. Obviously, such a large spacing (distance $\overline{ED}$) between pipes 16 and 18 would result in the device 12 being much longer than is required by the design shown in FIG. 1 wherein the end of pipe 18 is provided with diffuser portion 44.

To achieve a substantially constant volumetric throughput of gases through all channels 26 of the honeycomb element 24, it is necessary that the elements which define the coupling arrangement 10 bear certain relationships to each other. In one example that has been tested, the following dimensions were used:

Diameter of small pipe 18 = 2.0 in.
Diameter of larger pipe 16 = 4.75 in.
Length of diffuser portion $\overline{AB}$ = 1.75 in.
Distance between pipes $\overline{BD}$ = 0.875 in.
Total area of 16-3/8 in. side openings 46 = 1.77 in$^2$
Area of small end opening 48 = 0.05 in$^2$
Area of small pipe 18 = 3.14 in$^2$ The pressure drop produced by a diffuser 44 having the dimensions noted, for a gas velocity of 2,200 feet per minute was found to be only 0.19 in. of H$_2$O, a very insignificant amount compared to the pressure drop across the catalytic reactor element 24.

Referring to FIG. 1, the dimensional relationships which could be expected to provide satisfactory diffusion are as follows:

$\overline{AD}$ should be greater than one fourth the diameter of pipe 18.
$\overline{AB}$ should be 0.5–0.8 $\overline{AD}$.
Area of opening 48 should be 0.01–0.1 Area of pipe 18.
Area (total) of openings 46 should be 0.33–0.67 Area of pipe 18.

Figure 3:
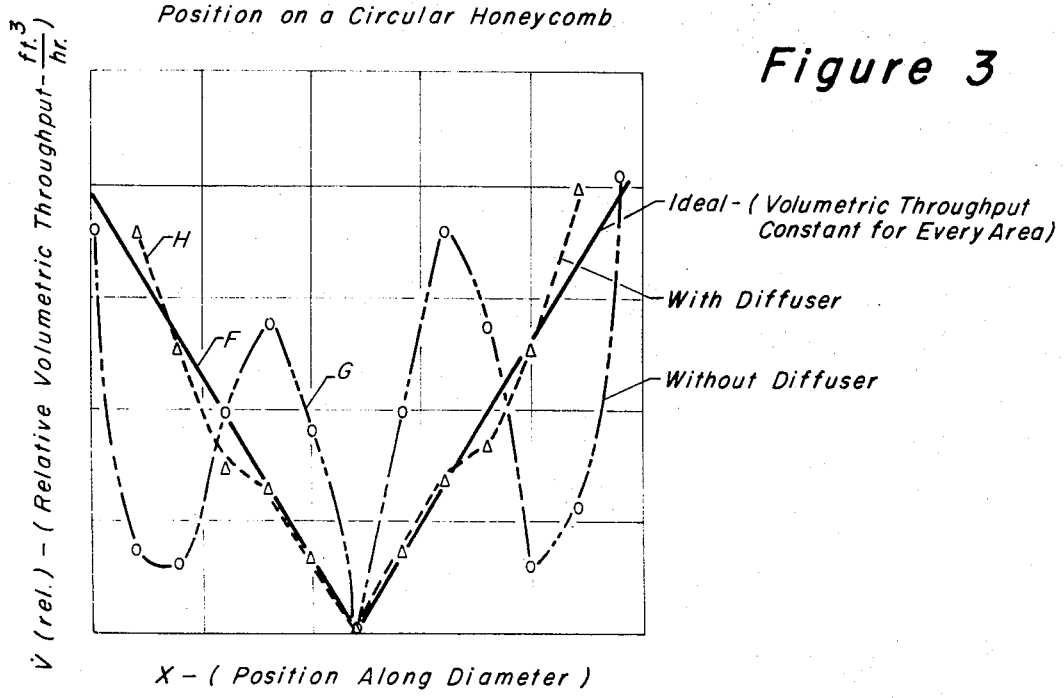
FIG. 3 is a graphical representation comparing the ideal relative volumetric throughput at successive points along a diameter of the large diameter pipe of FIG. 1, to the actual relative volumetric throughput which is achieved, with and without, the diffuser member of the present invention.

FIG. 3 is a graphical representation which shows the Relative Volumetric Throughput of gases passing through the face portion 28 of honeycomb element 24 at various points along a diameter of the element 24. The straightline curve "F" illustrates an ideal situation where all of the gases approaching the entire surface of face 28 have the same velocity. The curve is V-shaped since an annular area of the honeycomb having a predetermined radius is much greater at the outer edge than at the center. Curve "G" shows the Relative Volumetric Throughput of gases where diffuser portion 44 is omitted (not shown) so that pipe 18 terminates in an open end at location "A." In this latter situation, the frusto-conical portion 36 would be unable to uniformly diffuse the gases which would pass, for the most part, through the center section of the face 28. In this situation, 74 percent of the volumetric throughput was found to be passing through the central 45 percent of the cross-sectional area of face 28. Curve "H" shows the Relative Volumetric Throughput of gases where diffuser 44 is located as shown in FIG. 1 and corresponds very closely to Curve "F" showing the ideal situation.

We claim as our invention:

1. In a coupling arrangement wherein a pair of concentric pipes of different diameters are axially spaced from each other so that a line located in an axial plane and drawn between adjacent end edges of said pipes defines an angle greater than 15°, the improvement comprising: a frusto-conical transition member connecting the said end edge of the pipe of larger diameter to the pipe of smaller diameter at a connection portion thereof spaced from the end edge thereof, the length of said pipe of smaller diameter between its end edge and said connection portion defining an axial end or diffuser portion, cover plate means covering the end of said pipe of smaller diameter, said cover plate means having at least one opening therein proximate the axis of said pipe; said diffuser portion having a plurality of openings therein spaced about the periphery of its side walls, said openings being sized and located so as to cause a gaseous fluid flowing out of said pipe of smaller diameter to impinge upon a plane normal to the pipe axis and within said pipe of larger diameter with a substantially uniform velocity profile across said plane.

2. The coupling arrangement as set forth in claim 1 wherein the axial length of the transition member is at least one fourth the diameter of the pipe of smaller diameter.

3. The coupling arrangement as set forth in claim 2 wherein the axial length of the diffuser portion is between 50–80 percent of the axial length of the transition member.

4. The coupling arrangement as set forth in claim 1 wherein the total area of said at least one opening and said plurality of openings is 34–77 percent 5. The coupling arrangement as set forth in claim 4 wherein the area of said at least one opening is 1–10 percent of the internal area of the pipe of smaller diameter.

6. The coupling arrangement as set forth in claim 4 wherein the area of said plurality of openings is 33–67 percent of the internal area of the pipe of smaller diameter.

7. The coupling arrangement as set forth in claim 2 wherein the axial length of the diffuser portion is between 50–80 percent of the axial length of the transition member, the area of said at least one opening is 1–10 percent of the internal area of the pipe of smaller diameter, and the area of said plurality of openings is 33–67 percent of the internal area of the pipe of smaller diameter.

* * * * *